Patented Sept. 29, 1925.

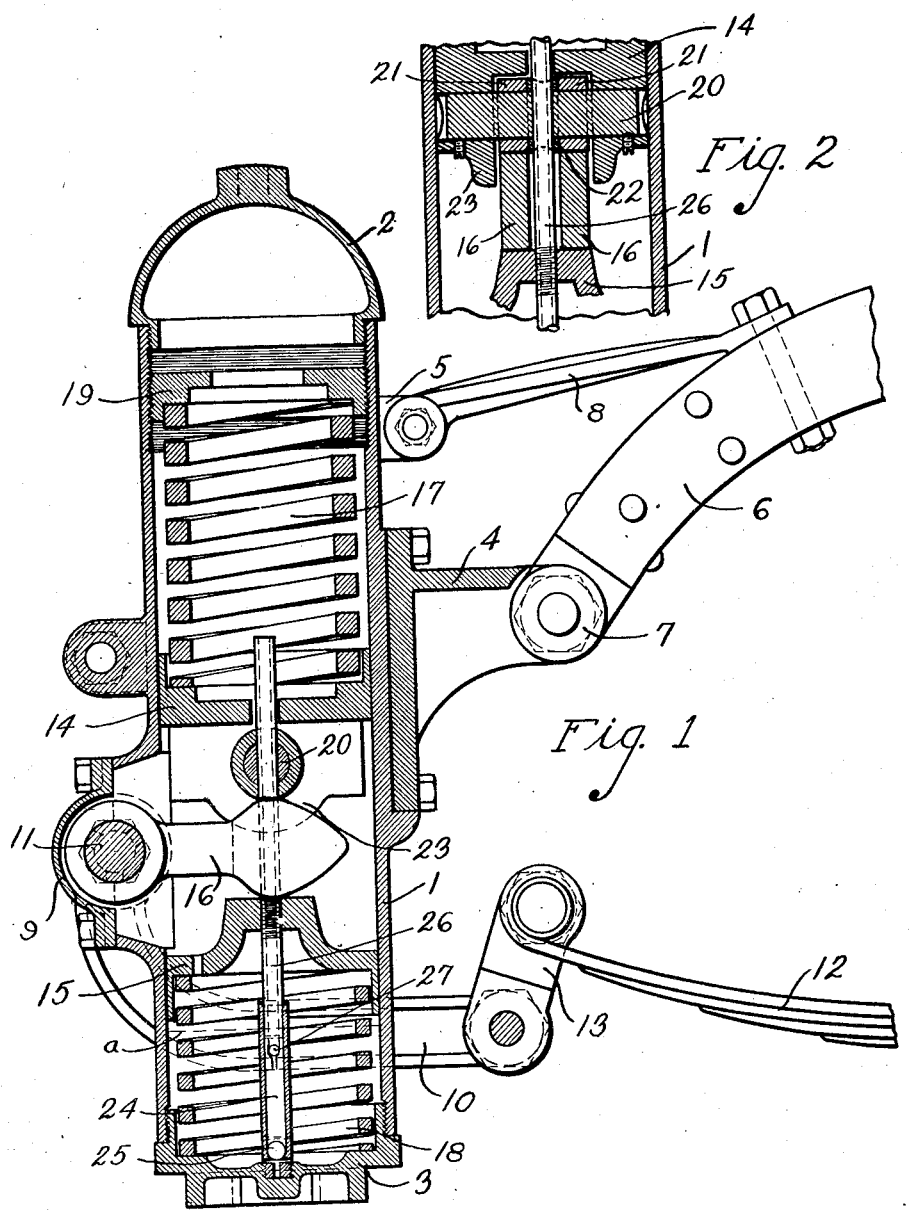

1,555,324

UNITED STATES PATENT OFFICE.

LOUIS L. MARY, NOW BY JUDICIAL CHANGE OF NAME LOUIS LEON LOMAR, OF HOUSTON, TEXAS.

SHOCK ABSORBER.

Application filed December 9, 1921. Serial No. 521,099.

*To all whom it may concern:*

Be it known that I, LOUIS L. LOMAR (formerly Louis L. Mary), a citizen of the United States, residing in Houston, in the county of Harris and State of Texas, have invented certain new and useful Improvements in Shock Absorbers, of which the following is a specification, reference being had therein to the accompanying drawings.

This invention relates to improvements in shock absorbers for automobiles, or the like, having particular reference to shock absorbers of the type illustrated and described in my copending applications for Letters Patent Serial No. 414,746, filed October 5, 1920, now Patent 1,491.018, dated April 22, 1924, and Serial No. 462,577, filed April 19, 1921, the present improvements consisting in refinements of construction and further development of the inventions to better adapt the same for economic manufacturing and more effective operation as used on automobiles of different makes.

As in my earlier inventions, above referred to, an object of the present invention is to provide shock absorbers of this character which can be manufactured and sold at low cost, which can be conveniently applied to any automobile or truck of the prevailing commercial types, and which will be of neat and attractive appearance.

As here shown, the shock absorbers are adapted to be mounted on the automobile between the chassis frame and springs so that the body of the machine will be suspended, when a full set of front and rear shock absorbers are used, entirely upon the shock absorbers which are so constructed and mounted relative to the chassis that the full force of the wheel shocks, when machines so equipped are driven over rough roads, passes through them and is practically absorbed thereby, and the body of the machine rides evenly or with smooth and comparatively slight undulations.

In the design of my improved shock absorbers proper attention has been given to the matter of appearance, the design having been adapted to effect suitable proportions in the lines of construction of the machine as a whole with the shock absorbers applied thereto, thus preserving the well balanced proportions of the original construction to which careful attention is given in automobile designs.

In the accompanying drawings:

Fig. 1 is a vertical sectional view of the shock absorber illustrating all the parts thereof and the manner of applying the same to the chassis of an automobile, and Fig. 2 is a detail vertical sectional view of internal parts of the mechanism taken substantially at right angles to the view of Fig. 1.

As here shown, the improved shock absorber consists of a dust and moisture-proof, tubular casing —1, having threaded end caps —2 and —3 thereon, and mounting brackets —4 and —5 whereby the casing is attached in fixed relation to the chassis frame —6,—bracket —4 being connected directly to the spring shackle bolt bearing —7, and bracket —5 to the frame —6 by means of a bracket extension, or brace —8. On the side opposite brackets —4 and —5, casing —1 is provided with a split bearing —9 in which rocker arms —10 only one of which is here shown, are pivoted on a shaft —11,— the arms extending forward on opposite sides of the casing and connected to the chassis spring —12 by means of a shackle link —13 which compensates for relative movement between the spring and casing —1.

The mechanism within casing —1 consists of opposite, spring-actuated pistons —14 and —15 which cooperates on opposite sides with a cam lever —16 which is secured to shaft —11 and is, therefore, operated by movement of arms —10,—the pistons —14 and —15 being held in contact with the cam by compression springs —17 and —18 respectively, the springs being balanced one with the other so that when the parts are in normal relation, as illustrated in Fig. 1, cam —16 will be disposed in a substantially horizontal plane. The lower end of spring —18 is seated in end cap —3 and the upper end of spring —17 is seated in a base —19 threaded into the upper end of casing —1 and adapted to be adjusted vertically therein to regulate the tension of spring —17 according to the weight that is normally suspended on the shock absorbers.

As is best shown in detail Fig. 2, piston —14 has a roller bearing consisting of a fixed shaft —20 and opposite rollers —21 spaced one from the other on shaft —20 by a collar —22, to provide for more effective cooperation of the piston with cam —16,— the lower end of the piston being bifurcated to provide supports in the downwardly extended walls —23 thereof for shaft —20 and clearance for rollers —21 therebetween. Thus the action of the cam on the piston, and vice versa, under all conditions of operation, is substantially parallel to the bore of casing —1 and greater freedom of action of the parts is obtained, also wear of the parts due to the end thrust of the piston thereon is minimized.

To provide for constant lubrication of the internal mechanism of the shock absorber, the lower portion of casing —1 is filled with oil to any suitable depth, as indicated in Fig. 1 by dotted line —a, and a vertically extended tube —24, having a ball valve —25 in the lower portion thereof, is threaded into end cap —3, and a tube —26 is threaded into piston —15 and has its upper free end extended through cam —16, which is slotted to clear the tube, spacing collar —22, shaft —20 and piston —14, and its lower end extended into tube —24,—the lower end of tube —26 also being provided with a ball valve —27, thus providing means for circulating oil to all the internal operable parts of the mechanism as piston —15 is moved up and down by action of the shock absorber, the oil returning by gravity flow to the lower part of the casing.

From the foregoing detailed description and the illustrations of the drawings, the construction and operation of my improved shock absorber will be readily understood. The construction is simple, substantial and effective in operation. In driving automobiles equipped with the shock absorbers over rough roads all normal wheel shocks will be absorbed by springs —17 and the rebound by springs —18, thus the undulations of the machine body will be of comparatively slight degree, and occupants of the machine will experience greater comfort and pleasure of riding.

Having described my invention, I claim:

1. A shock absorber comprising a casing, pistons within said casing, a conduit extending through said pistons and adapted to form a passage for lubricant, one of said pistons being provided with a roller bearing, and a cam element operably mounted on said casing, said cam element having operative relation with said roller bearing of one piston and direct operative relation with the other piston, said casing and said cam element being adapted to be connected to relatively movable parts of a vehicle.

2. A shock absorber comprising a casing, opposed pistons within said casing, a conduit extending through said pistons and adapted to form a passage for lubricant, one of said pistons being provided with a roller bearing, a lever pivoted to said casing and projecting within said casing, the inwardly projecting portion of said lever having opposite cam faces adapted to engage one of said pistons and the roller bearing of the other piston, said casing and said lever being adapted to be connected to relatively movable parts of a vehicle.

3. A shock absorber for motor vehicles, including in combination with the chassis, a cylindrical casing adapted to be mounted on the chassis frame, opposite spring-actuated pistons operable in said casing, one of the pistons being provided with a roller bearing operating connection consisting of a shaft fixed in the piston, opposite sleeves operable on said shaft and a spacing collar fixed on the shaft between said sleeves, and a cam element operably mounted on said casing and connected to the chassis spring and having operative relation through said roller bearing with one piston and direct operative relation with the other piston.

4. A shock absorber for motor vehicles, including in combination with the chassis, a cylindrical casing adapted to be mounted on the chassis frame and to contain a lubricant, opposite pistons operable in said casing one opposed to the other, and a cam element operably mounted on said casing and connected to the chassis spring and to said pistons, a valve-controlled conduit supported in the lower portion of said casing in said lubricant and cooperating with the action of the lower piston to conduct the lubricant to the mechanism in said casing.

5. A shock absorber for motor vehicles, including in combination with the chassis, a cylindrical casing mounted on the chassis frame and adapted to contain a lubricant, opposite pistons operable in said casing one opposed to the other, a cam element mounted on said casing and operably connected to the chassis spring and to said pistons, and a valve-controlled conduit supported in the lower portion of the casing in said lubricant, extended upwardly through both pistons and cooperating with the action of the lower piston to conduct the lubricant to the mechanism in the portion of the casing above the upper piston, and means to conduct the displaced lubricant to the mechanism in the lower portion of the casing by gravitation.

6. A shock absorber for motor vehicles, comprising a casing adapted to be mounted on the vehicle frame, opposed pistons within said casing, a cam element operably mounted on said casing and adapted to be connected to the vehicle spring, said cam element being in operative relation with said pistons, and a valve-controlled conduit through which lubricant may pass from one side of said pistons to the other.

7. A shock absorber for motor vehicles, comprising a casing adapted to be connected to the vehicle frame, opposed pistons within said casing, a cam element operably mounted on said casing and adapted to be connected to the vehicle spring, said cam element being in operative relation with said pistons, and a conduit extending through said pistons and adapted to form a passage for lubricant.

8. A shock absorber for motor vehicles, comprising a casing, a lever pivoted to said casing and having an end extended into said casing, said lever and said casing being adapted to be attached to relatively movable parts of a vehicle, pistons within said casing, the inwardly extended end of said lever being operatively related to said pistons, a valve-controlled conduit cooperating with the action of the lower piston to conduct lubricant to the portion of the casing above the upper piston, and means for conducting the displaced lubricant to the lower portion of the casing by gravity.

9. A shock absorber comprising a casing, pistons within said casing, one of said pistons being provided with a roller bearing, a cam element operably mounted on said casing, said cam element having operative relation with said roller bearing of one piston and with said other piston, said casing and said cam element being adapted to be connected to relatively movable parts of a vehicle, and a valve-controlled conduit through which lubricant may pass from one side of said pistons to the other.

10. A shock absorber comprising a casing, pistons within said casing, one of said pistons being provided with a roller bearing member comprising a shaft carried by the piston and spaced sleeves on said shaft, a cam element operably mounted on said casing and having operative relation through said roller bearing with the piston carrying said bearing, said casing and said cam element being adapted to be connected to relatively movable parts of a vehicle, and a valve-controlled conduit extending through said pistons and between the spaced sleeves of said roller bearing, said conduit being adapted to form a passage for lubricant.

11. A shock absorber comprising a casing adapted to be connected to the frame of a vehicle, a pivoted lever having an end extended into said casing and an end adapted to be connected to the free end of the vehicle spring, opposed pistons within said casing, the inwardly extended end of said lever being operatively related to said pistons, and a conduit extending through said pistons and forming a passage for lubricant from one side of said pistons to the other.

12. A shock absorber comprising a casing adapted to be connected to the frame of a vehicle, a lever pivotally connected to the free end of the vehicle spring and extending into said casing, opposed pistons within said casing, the inwardly extended portion of said lever being operatively positioned between said pistons, and a valve-controlled conduit through which lubricant may pass from one side of said pistons to the other.

13. A shock absorber comprising a casing adapted to be connected to the frame of a vehicle, a lever pivoted to said casing and having an end extended into said casing and an end adapted to be connected to the free end of the vehicle spring, yieldable elements arranged in said casing to counteract one another, spaced pistons operably interposed between said elements, the inwardly extended end of said lever being operatively positioned between said pistons, and a valve-controlled conduit through said pistons forming a passage for lubricant from one side of said pistons to the other.

14. A shock absorber comprising a casing adapted to be attached to the frame of a vehicle, a lever pivoted to said casing and having an end extended into said casing and an end adapted to be pivotally connected to the vehicle spring, yieldable elements in said casing, spaced pistons operably interposed between said elements, the inwardly extended end of said lever having cam faces in operative relation with said pistons, and a conduit extending through said pistons and adapted to form a passage for lubricant from one side of said pistons to the other.

In testimony whereof, I affix my signature.

LOUIS L. LOMAR,
*Formerly Louis L. Mary.*